United States Patent [19]

Hergenrother et al.

[11] 4,179,553

[45] Dec. 18, 1979

[54] POLYPHOSPHAZENE POLYMERS CONTAINING CYCLIC KETAL SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 957,512

[22] Filed: Nov. 3, 1978

[51] Int. Cl.$^2$ .............................................. C08G 79/04
[52] U.S. Cl. ................................... 528/168; 528/126; 528/127; 528/224; 528/228; 528/374; 528/399; 528/405
[58] Field of Search ................ 528/399, 405, 168, 374

[56] References Cited

U.S. PATENT DOCUMENTS 2,214,769   9/1940   Lipkin .................................. 528/399

Primary Examiner—Wilbert J. Briggs, Sr.

[57] ABSTRACT

Polyphosphazene polymers are prepared which contain repeating units represented by the formulas:

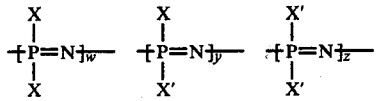

wherein X is represented by

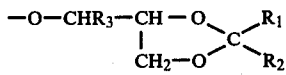

wherein $R_1$ and $R_2$ are independently selected from a group consisting of substituted or unsubstituted aliphatic, aryl, araryl, alkylaryl and heterocyclic radicals or $R_1$ and $R_2$ can be linked to form a cyclic radical and $R_3$ is an aliphatic hydrocarbon radical or hydrogen, X' is a substituted or unsubstituted alkoxy, aryloxy, amino or mercapto substituent group or mixtures thereof which are compatible with an N-substituted amino substituent and are known in the state of the art of polyphosphazene technology; and $20 \leq (w+y+z) \leq 50,000$ per polymer and $(y+z) > 0$.

The polymers of the invention can be utilized to form protective films and can also be utilized in applications such as molding, coatings, foams and the like.

11 Claims, No Drawings

POLYPHOSPHAZENE POLYMERS CONTAINING CYCLIC KETAL SUBSTITUENTS

BACKGROUND OF THE INVENTION

Polyphosphazene polymers containing repeating

units in which various substituted and unsubstituted alkoxy, aryloxy, amino and mercapto groups are attached to the phosphorus atom and their method of preparation are described in the prior art as illustrated in the publication "Nitrogen-Phosphorus Compounds", Academic Press, New York, N.Y., 1972 by H. R. Allcock and "Poly(organophosphazenes)", Chemtech, Sept. 19, 1975, by H. R. Allcock and in such U.S. Pat. Nos. 3,515,688; 3,702,833; 3,856,712; 3,974,242; and 4,042,561, the disclosures of which are herein incorporated by reference.

However, none of the aforementioned publications and patents or for that matter, none of the prior art of which applicants are aware, discloses or suggests polyphosphazene copolymers containing cyclic ketal substituents attached to the phosphorus atom or methods of preparing such polymers.

SUMMARY OF THE INVENTION

This invention relates to polyphosphazene copolymers containing repeating

units in the polymer chain in which cyclic ketal substituents are attached to the phosphorus atom. More particularly, the invention relates to polyphosphazene polymers having substituents derived from a cyclic ketal containing a pendant hydroxy group which are attached to the phosphorus atom and to a method of preparing such polymers. Any substituent groups such as alkoxy, aryloxy, amino and mercapto groups which are known in the polyphosphazene state of the art can be substituted onto the polyphosphazene in addition to the cyclic ketal substituents. These substituents may be substituted onto the polyphosphazene by the method disclosed in the present invention or by prior art methods.

DETAILED DESCRIPTION OF THE INVENTION

The polymers of the invention contain repeating units represented by the formuls:

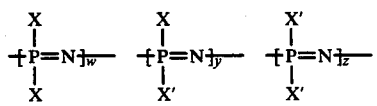

wherein X is represented by:

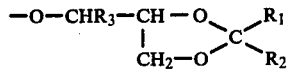

$R_1$ and $R_2$ are independently selected from a group consisting of substituted or unsubstituted aliphatic, aryl, arayl, alkylaryl and heterocyclic radicals or $R_1$ and $R_2$ can be linked to form a cyclic radical, $R_3$ is an aliphatic hydrocarbon radical or hydrogen, X' is a substituted or unsubstituted alkoxy, aryloxy, amino or mercapto substituent group or mixtures thereof which are compatible with cyclic ketal substituent and are known in the state of the art of polyphosphazene technology; and $20 \leq (w+y+z) \leq 50,000$ per polymer and $(y+z) > 0$. The substitution on the various substituted groups may be any "non-reactive" substituent, i.e., a substituent which is non-reactive with the various materials present during polymer formation. Suitable substituents include chlorine, bromine, phenoxy, alkoxy and the like.

In the polymer units represented by the above formulas, all X substituent groups can be the same or they can be mixed and all X' substituent groups can be the same or mixed. In the mixtures, the X substituent groups can be mixtures of different cyclic ketal groups and the X' substituent groups can be mixtures of alkoxy, aryloxy, amino and mercapto groups.

The phosphazene polymers of the invention can be represented by the formula:

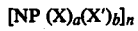

wherein n' is from 20 to 50,000 and a+b=2, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least ten mole percent of the X substituent.

The homopolymer, that is, where all substituent groups on the polyphosphazene polymer are cyclic ketal derivatives, can not be prepared by the method of the present invention or by prior art methods. The polyphosphazene copolymer can contain cyclic ketal derivatives in up to about 80% of the total possible substitution sites. It is very difficult to substitute a higher percentage of the possible sites due to steric hindrance in substitution of the cyclic ketal derivatives.

An advantage in the substitution of a cyclic ketal substituent onto the polyphosphazene polymer is that such a derivative would exhibit enhanced water solubility and this enhanced solubility can be further improved by complete hydrolysis of the ketal to a diol.

The term polymer herein includes within its meaning copolymer, that is, polymer units containing more than one substituent in a non-repeating manner.

The polymers can be used to prepare protective films and may be utilized in applications such as moldings, foams, coatings, and the like.

METHODS OF PREPARATION

The polymers are prepared by reacting a poly(dichlorophosphazene) having the formula—(NPCL$_2$)-$n'$—, in which n' is from 20 to 50,000, in the presence of a tertiary amine with a mixture of cyclic ketal containing a pendant hydroxy group with any compound which is reactive with the poly(dichlorophosphazene) to form a substitution group on a phosphorus atom in the poly(dichlorophosphazene) which is known in the state of the art. Examples of such compounds are discussed in the section entitled "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula—$(NPCl_2)_{n'}$—, in the aforementioned references, the polymers are in general prepared by the thermal polymerization of cyclic oligomers having the formula $(NPCl_2)_m$ in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. CYCLIC KETALS WHICH MAY BE USED TO FORM THE POLYMERS OF THE INVENTION

Cyclic ketals which are used to form the polymers of the invention are represented by the formula:

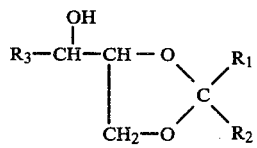

wherein $R_1$ and $R_2$ are independently selected from a group consisting of substituted or unsubstituted aliphatic, aryl, araryl, alkylaryl and heterocyclic radicals or $R_1$ and $R_2$ can be linked to form a cyclic radical and $R_3$ is an aliphatic hydrocarbon radical or hydrogen. These ketals are formed by a reaction of a trihydroxy aliphatic compound and a ketone.

Suitable trihydroxy aliphatic compounds which are reactive with ketons to form the ketals of the present invention include: glycerol; 1,2,3-trihydroxybutane; 1,2,3-trihydroxypentane; 1,2,3-trihydroxy-hexane; 1,2,3-trihydroxy-5-methyl-hexane; 1,2,3-trihydroxyheptane; 1,2,3-trihydroxy-5-methyl-heptane; 1,2,3-trihydroxynonane; 1,2,3-trihydroxydecane; and the like. These trifunctional hydroxy containing compounds contain an adjacent primary and secondary carbon atoms containing a hydroxy group, these hydroxy groups being more reactive than the remaining hydroxy group in the trihydroxy compound thereby permitting cyclicization in the formation of the ketal by a reaction with a ketone.

All ketones can be used to react with the trihydroxy aliphatic compounds to form the cyclic ketals of the present invention. Illustrative examples of ketones include: acetone, methylethyl ketone, methyl n-propylketone, ethyl ketone, methyl n-butyl ketone, propyl ketone, ethyl n-propyl ketone, methyl sec-butyl ketone, methyl t-butyl ketone, methyl n-propyl ketone, ethyl n-pentyl ketone, pentyl ketone, methyl hexyl ketone, cyclohexanone, acetophenone, n-butyrophenone benzyl methyl ketone, benzyl ethyl ketone, benzyl propyl ketone, benzyl hexyl ketone, 2-furyl methyl ketone and the like.

Illustrative examples of cyclic ketals which can be used to form the polymers of the invention include: the acetone ketal of glycerol (2,2-dimethyl-1,3-dioxalone-4-methanol), the methyl ethyl ketone ketal of glycerol, the methyl propyl ketone ketal of glycerol, the acetophenone ketal of glycerol, the benzyl ethyl ketone ketal of glycerol, the cyclohexanone ketal of glycerol, the acetone ketal of 1,2,3-trihydroxybutane, the ethyl methyl ketone ketal of 1,2,3-trihydroxybutane, the benzyl propyl ketone ketal of 1,2,3-trihydroxybutane, the acetone ketal of 1,2,3-trihydroxypentane, the acetone ketal of 1,2,3-trihydroxyhexane, the cyclohexanone ketal of 1,2,3-trihydroxyhexane, the pentyl ketone ketal of 1,2,3-trihydroxy-5-methyl-hexane, the methyl isopropyl ketone ketal of 1,2,3-trihydroxyheptane, the benzyl hexyl ketone ketal of 1,2,3-trihydroxy-5-ethyl-heptane, the acetone ketal of 1,2,3-trihydroxy-nonane, the methyl ethyl ketone ketal of 1,2,3-trihydroxydecane and the like.

The preferred compound for preparing the polyphosphazene polymers of the present invention is the acetone ketal of glycerol.

III. ADDITIONAL REACTIVE COMPOUNDS

As indicated heretofore, the polyphosphazene copolymers of the invention in addition to the cyclic ketal substituent groups contain substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,5-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

Aryloxy groups (substituted or unsubstituted) derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri- halogen substituted phenols and the like; and alkoxy-substituted phenols such as 4-methoxyphenol; 4-(n-butoxy) phenol and the like.

Mixtures of the foregoing aromatic alcohols can also be employed.

Amino groups derived from any of the amino compounds heretofore employed in the polyphosphazene polymer art. Thus, the amino groups can be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al (hereby incorporated by reference) can be utilized. Representative of suitable mercaptan compounds as described in the aforementioned patent are methyl mercaptan and its homologs ethyl, propyl, butyl, aryl, and hexyl mercaptan, thiophenol, thionaphthols, benzyl mercaptan, cyclohexyl mercaptan and the like.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,073,824; 4,073,825; and 4,076,658 which are hereby incorporated by reference and include —OCH=CH and —OR$_3$CF=CF$_2$, as well as similar groups which contain unsaturation. Generally, when present, the moieties containing crosslinking functionality are usefully present in an amount between 0.1 mole % to about 50 mole % and usually between 0.5 mole % and about 10 mole % based on the replaceable chlorine in the starting poly(dichlorophosphazene).

IV. THE TERITARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

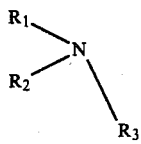

wherein R$_1$, R$_2$, and R$_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine and the like. In addition, tertiary amines such as pyridine, and thos containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; N-methyl pyrrole; 1,4-diazo-bicyclo[2.2.2]octane (DABCO) and dipiperidyl ethane.

As indicated above, the polymers of the present invention are prepared by reacting a poly(dichlorophosphazene) polymer, a cylic ketal containing a pendant hydroxy group and compounds listed in the groups of "Additional Reactive Compounds" which may be substituted onto the poly(dichlorophosphazene) in the presence of a tertiary amine.

The specific reaction conditions and proportion of ingredients employed in preparing these polymers can vary somewhat depending on factors such as the reactivity of the specific cyclic ketal utilized, the reactivity of the compound or compounds used to form copolymer substituents, the particular tertiary amine employed, and the degree of substitution desired in the finished polymer. In general, reaction temperatures can range from about 25° to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantially complete conversion of the chlorine atoms in the polymer to the corresponding alkoxy linkages with the cyclic ketal compounds as well as forming linkages with the copolymer substituents.

The above reaction is ordinarily carried out in the presence of a solvent. The solvent employed in the reaction should be a solvent for the poly(dichlorophosphazene) polymer, the cyclic ketals the compounds from which the copolymer substituents are derived, and the tertiary amine. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture materials can be employed. In addition, the materials in the reaction zone should be reasonably free of water. The prevention of substantial amounts of water in the reaction system is necessary in order to inhibit the reaction of the available chlorine atoms in the chloropolymer. Preferably the reaction mixture should contain less than about 0.01% water.

In general, the amount of combined total of the cyclic ketal compounds and the copolymer forming compounds employed in the process should be at least molecularly equivalent to the number of available chlorine atoms in the polymer mixture. However, preferably a slight excess of such compounds should be employed in order to insure complete reaction of all the available chlorine atoms.

While the cyclic ketal containing poly(phosphazene) polymers of the present invention have been prepared in the above-identified manner, that is, in the presence of a tertiary amine, alternative methods of preparation are available. The prior art methods of poly(dichlorophosphazene) substitution such as the reaction with sodium alkoxide as demonstrated in U.S. Pat. No. 3,370,020 to Allcock et al may be used to substitute the cyclic ketal containing groups which are derived from cyclic ketal compounds containing a pendant group and the substituents derived from the compounds listed in the list of additional reactive compounds.

The prior art methods may be used to substitute the above-identified substituents onto the poly(dichlorophosphazene) or may be used to partially substitute the poly(dichlorophosphazene) with groups other than cyclic ketal groups whereas the remaining chlorines on the partially substituted poly(dichlorophosphazene) may be replaced with cyclic ketal groups using the tertiary amine substitution process.

The following examples is submitted for the purpose of further illustrating the nature of the present scope thereof. Parts and percentages referred to in the examples and throughout the specification are by weight unless otherwise indicated.

EXAMPLE 1

A 10 oz. bottle was charged with 5.47 cc (44 millioles) of the acetone ketal of glycerol, 100 cc of dry tetrahydrofuran (hereinafter THF) 12.3 cc (88 millimoles of dry triethylamine, and 40.2 gms (40.2 millimoles) of a 11.6% dichlorophosphazene polymer solution in THF. This solution was heated to 120° C. for 20 hours and then cooled. The colorless solution contained needlelike crystals of triethylamine hydrochloride. 3.2 cc (44 millimoles) of dry trifluoroethanol was added to the solution which was then reheated to 120° C. for a period of 20 hours forming a larger layer of amine hydrochloride. An I. R. analysis of the THF solution showed almost total loss of the P-Cl bond at 600 cm$^{-1}$ indicating a high percentage of substitution on the polyphosphazene polymer. Coagulation of the polymer in hexane yielded 3.17 gms. of a light tan colored powder having a Tg of 26° C., a tm of 107° and the following elemental analysis:

|  | C | H | N | P | Cl |
|---|---|---|---|---|---|
| Found | 25.68 | 5.15 | 8.88 | 16.37 | 2.03 |
| Cal.* | 25.69 | 5.12 | 8.56 | 16.52 | 2.76 |

*Based on 42.4% of the glycerol acetone ketal derivative
10.79% Et$_3$N.HCl, 9.1% trifluoroethanol substituent,
30.9% hydrolyzed chlorophosphazene

EXAMPLE 2

A 28 oz bottle was charged with 12.2 cc (98.4 millimoles) of the acetone ketal of glycerol, 4.18 gm (90.9 millimoles) of a 50% Na dispersion, 120 cc of pentane, and 250 cc of THF. This mixture was heated to 60°-70° C. until 120 cc of solvent was removed as the pentane/water azeotrope. To the remaining mixture was added 42.3 cc of 2.58 M (109.2 millimoles) of sodium trifluoroethanol in a THF solution and 11.3 gm. (89.7 millimoles) of a 9.34% solution of polydichlorophosphazene in a THF solution. This solution was heated for 20 hours at 80° C. and then cooled. An I.R. analysis of the solution showed a weak P-Cl bond band at 600 cm$^{-1}$ and new bands were formed at 562, 520 and 468 cm$^{-1}$. The excess base in the solution was neutralized with CO$_2$ followed by centrifugation to give a clear solution which yielded 3.6 gm. of a tan polymer upon coagulation in hexane. The polymer was analyzed as containing 4.42% Cl and 4.34% Na.

EXAMPLE 3

A 10 oz. bottle was charged with 5.47 cc (44 millimoles) of the acetone ketal of glycerol, 100 cc of alcohol free trichloromethane, 12.3 cc (88 millimoles) of triethylamine, and 52.9 gm (39.2 millimoles) of a 8.6% dichlorophosphazene polymer solution in cyclohexane. This solution was heated for 20 hours at 120° C. 4.43 cc (44 millimoles) of p-chlorophenol was added to the solution which was further heated at 120° C. for an additional period of 68 hours and then cooled. An I.R. analysis of the solution showed a loss of the P-Cl band bond at 600 cm$^{-1}$ and new bands were formed at 556,542, and 510 cm$^{-1}$. Coagulation of the polymer in methanol yielded 6.84 gms of a dark red rubbery material.

We claim:

1. A polyphosphazene polymer containing units represented by the formulas:

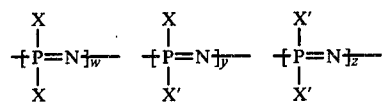

wherein X is

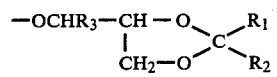

in which R$_1$ and R$_2$ are independently selected from a group consisting of substituted and unsubstituted aliphatic, aryl, arayl, alkylaryl and heterocyclic radicals or R$_1$ and R$_2$ can be linked to form a cyclic radical and R$_3$ is selected from the group consisting of an aliphatic hydrocarbon radical and hydrogen wherein X' is selected from the group consisting of chlorine and a substituted and unsubstituted alkoxy, aryloxy, amino and mercapto radical or mixtures thereof; 20≦(w+y+z)≦50,000 per polymer; and X and X' are independently selected for each unit.

2. The polymer of claim 1 in which X is

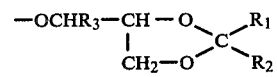

in which R$_1$ and R$_2$ are alkyl groups containing 1 to 6 carbon atoms and R$_3$ is hydrogen.

3. The polymer of claim 2 in which X is derived from the acetone ketal of glycerol.

4. The polymer of claim 1 wherein X substituents of the polymer units is

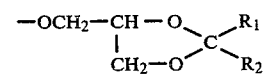

in which R$_1$ and R$_2$ are alkyl groups containing from 1 to 6 carbon atoms wherein the X' substituent of said units is selected from the group consisting of chlorine, substituted and unsubstituted alkoxy, aryloxy, amino and mercapto radicals and mixtures thereof and wherein the units are randomly distributed.

5. The polymer of claim 4 wherein X is derived from the acetone ketal of glycerol and X' is derived from trifluoroethanol.

6. The polymer of claim 4 wherein X is derived from the methyl ethyl ketone ketal of glycerol and X' is derived from trifluoroethanol.

7. A method of preparing polyphosphazene polymers containing units represented by the formulas:

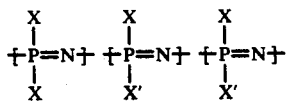

wherein X is

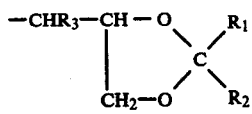

in which $R_1$ and $R_2$ are independently selected from the group consisting of aliphatic, aryl, alkylaryl and heterocyclic radicals or $R_1$ and $R_2$ can be linked to form a cyclic radical and $R_3$ is selected from the group consisting of hydrogen and aliphatic hydrocarbon radicals, wherein X' is selected from the group consisting of chlorine, substituted and unsubstituted alkoxy, aryloxy, amino, mercapto radicals and mixtures thereof; said method comprising reacting a poly(dichlorophosphazene) polymer having the formula—$(NPCL_2)_n$—, wherein n is from 20 to 50,000 with a cyclic ketal containing a pendant hydroxy group in the presence of a tertiary amine, optionally followed by the addition of an alkanol, aryl alcohol, amine, mercaptan or a mixture thereof in the presence of a tertiary amine.

8. The method of claim 7 wherein the cyclic ketal containing a pendant hydroxy group is the acetone ketal of glycerol.

9. The method of claim 7 wherein X is derived from the acetone ketal of glycerol and X' is derived from trifluoroethanol.

10. The method of claim 7 wherein X is derived from the ethyl methyl ketone ketal of glycerol and X' is derived from trifluoroethanol.

11. The method of claim 7 wherein X is derived from the acetone ketal of glycerol and X' is derived from p-chlorophenol.

* * * * *